United States Patent [19]

Barnett

[11] Patent Number: 5,557,657
[45] Date of Patent: Sep. 17, 1996

[54] HANDOFF BETWEEN OVERLAY AND UNDERLAY CELLS

[75] Inventor: Charles A. Barnett, Sterling, Va.

[73] Assignee: Hughes Aircraft Company, Los Angeles, Calif.

[21] Appl. No.: 118,548

[22] Filed: Sep. 9, 1993

[51] Int. Cl.⁶ .................................... H04Q 7/38
[52] U.S. Cl. ............. 379/60; 379/59; 455/33.2; 455/33.4
[58] Field of Search ............ 379/59, 60; 455/33.1, 455/33.2, 33.3, 33.4

[56] References Cited

U.S. PATENT DOCUMENTS

| | | | |
|---|---|---|---|
| 4,613,990 | 9/1986 | Halpern | 455/33.2 |
| 4,718,081 | 1/1988 | Brenig | 455/33.3 |
| 5,278,991 | 1/1994 | Ramsdale et al. | 455/33.2 |
| 5,422,933 | 6/1995 | Barnett et al. | 379/60 |

*Primary Examiner*—Dwayne D. Bost
*Attorney, Agent, or Firm*—Gordon R. Lindeen, III; Wanda K. Denson-Low

[57] ABSTRACT

A mechanism for handing off between an overlay cell (48) and an underlay cell (50). The underlay cell (50) is smaller than and has a common area with the overlay cell. A threshold level (RSSI-THP) is established which corresponds to the sum of a nominal threshold level (RSSI-U) and a value obtained by subtracting the current attenuation level (MT) from the minimum attenuation level permitted by the underlay cell (MU). If the RF signal level of the serving cell (RSSI-SRV) is greater than the established threshold level (RSSI-THP), the mobile unit is handed off to the underlay cell (50), if not already in that cell; and handed off to the overlay cell (48) if equal to or less than the established threshold level (RSSI-THP), if not already in that cell.

11 Claims, 5 Drawing Sheets

HANDOFF BETWEEN OVERLAY AND UNDERLAY CELLS

BACKGROUND OF THE INVENTION

1. Field of Invention

The present invention relates to cellular communications; and more particularly to a method and apparatus for handing off on-going communication between cells.

2. Description of Related Art

A cellular communication system includes several base transceiver stations, each of which transmits and receives channels of RF information throughout a predetermined coverage area referred to as a cell. The outer boundary of a cell is determined not only by the effective radiated power of the base transceiver, which determines the maximum range at which a mobile unit is able to receive; but also, by the effective radiated power of the mobile telephones, which determines the maximum range at which the base station is able to receive. The base transceiver stations (BTS) determine their corresponding cell's handoff boundaries by setting an RF signal threshold value which must be met or exceeded by a mobile unit entering the cell in order to transfer an on-going call to that cell.

Based upon the received RF signal strength of the mobile unit by the transceiver of the serving cell, the BTS controls the effective radiated output power (ERP) of the mobile unit so that the transmission by the mobile unit does not saturate the base station transceiver when it is close to the center of the cell, but is of sufficient power to enable the BTS to receive the mobile transmission when it is far from the transceiver. When the RF received signal strength of a traffic channel of a neighboring cell measured by the scanning receiver in the serving cell exceeds the set RF signal threshold value that is configured into the system; then the system switches on-going communication to a traffic channel of the neighboring cell, thus, effecting a handoff.

The base station equipment for each cell is structured to handle an expected maximum number of concomitant cells involving mobile units located within a specific geographic area. Should this maximum number be reached, no channels are available; and a newly initiated call is blocked, or an on-going call is lost during an attempted handoff to the congested cell.

Many geographic areas, particularly large metropolitan locations have many mobile phone units in operation at any one time. This, of course, results in the aforementioned call blocking as well as interference when the loading in a particular cell becomes excessive. To avoid the excessive loading of an individual cell, it has been proposed to divide the metropolitan area into several small neighboring cells. This, of course, increases the complexity and amount of equipment that must be installed at the base station of each of the small neighboring cells, particularly scanning receivers for measuring the signal strength in order to effect a handoff between the neighboring cells.

Thus, there is a need for a method and system to accommodate the large number of mobile units in use at a given time without the necessity of increasing the complexity and amount of equipment to effect a handoff.

SUMMARY OF THE INVENTION

Accordingly, the present invention is directed to a method and system that substantially obviates one or more of the problems due to limitations and disadvantages of the related art.

To achieve these and other advantages, and in accordance with the purpose of the present invention, as embodied and broadly described, the invention is a method of handing off on-going mobile communications of a mobile unit between an overlay cell having a first coverage area and an underlay cell having a second coverage area common with and less than the first coverage area, the method comprising establishing a threshold level and handing off the on-going communication of the mobile unit to the underlay cell at times when RF signal strength of the serving cell is greater than the established threshold level and to the overlay cell at times when the RF signal strength of the serving cell is equal to or less than the established threshold level.

In another aspect, the invention is a cellular communication system comprising a plurality of base station transceivers positioned adjacent one another, one of said plurality of transceivers having a signal strength greater than a signal strength of an adjacent transceiver to define an underlay and an overlay cell, the system comprising a base station controller coupled to the plurality of base station transceivers for storing at times a current transmit attenuation level of a mobile unit and storing a minimum mobile transmit attenuation level permitted by the underlay cell, means for establishing a threshold value for a mobile unit, and means for handing off the mobile unit to the overlay cell at times when the RF signal strength of the serving cell is equal to or less than the established threshold value, and to the underlay cell at times when the RF signal strength of the serving cell is greater than the established threshold level.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

DESCRIPTION OF PREFERRED EMBODIMENT

Figure 1:
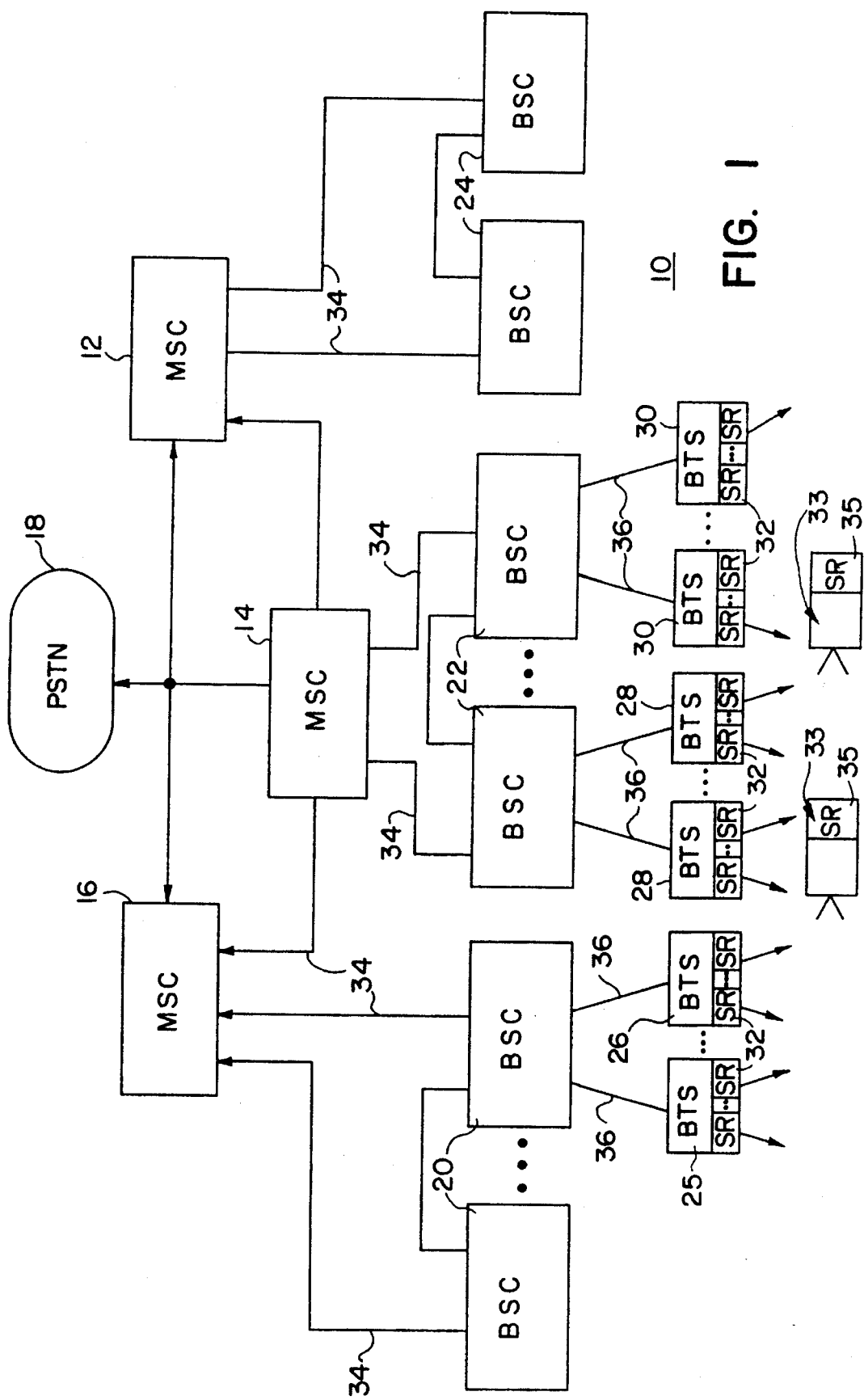
FIG. 1 is a block diagram of a cellular communication system incorporating the principles of the present invention.

A system for effecting handoff of an on-going mobile telephone communication from a serving cell to a neighboring cell is included in and is part of a cellular communication system as exemplified in FIG. 1, which system is generally referred to as 10.

Cellular system 10 has a plurality of mobile switching centers (MSC) 12, 14 and 16 which are connected to each other and to a public switched telephone network (PSTN) 18. Each of the MSC's is connected to a respective group of base station controllers (BSC), each group being referred to as 20, 22 and 24. Each BSC is connected to a group of individual base transceiver stations (BTS) referred to as 26, 28, and 30 respectively. Each BTS defines an individual cell of the communication system.

Each BTS of the groups 26, 28, and 30 includes hardware and software functions required to communicate over the radio channels of the system; and includes transmitters and receivers for communication with the mobile telephone units. With the exception of BTS 25, which is the base transceiver station for the underlay cell, each BTS also includes a plurality of individual scanning receivers (SR) referred to at 32 for scanning selected traffic channels. Each BTS also includes digital multiplex equipment for transmission of audio traffic to its associated BSC.

A plurality of digital mobile units 33 are used with a system for communication over RF traffic channels with the BTS of a particular cell in which it is located. Associated with each digital mobile unit 33 is a scanning receiver 35 for scanning at the request of the BSC selected channels of the serving and neighboring cells.

Each BSC of group 20, 22, and 24 implements audio compression/decompression and handles call establishment, disconnect, and handoff procedures, and allocates system resources between the individual BTS's associated with a particular BSC. More specifically, each BSC performs handoff execution for transferring on-going communications from one cell to another within the group of BTS's connected to the particular BSC. Each BSC communicates with its associated MSC for effecting a handoff involving a cell or BTS associated with a different BSC. Thus, BSC 20 to which is connected BTS 25 and BTS 26 executes the handoff between an underlay and overlay cell.

Each MSC 12, 14, and 16 processes all requests for calls, switching functions, as well as the mobility functions of registration, authentication and handoff. Each MSC includes a home location register (HLR), which is a permanent data base of all subscribers and a visitor location register (VLR), which is a semipermanent data base for users who are recently active in the area served by the MSC.

Figure 2:
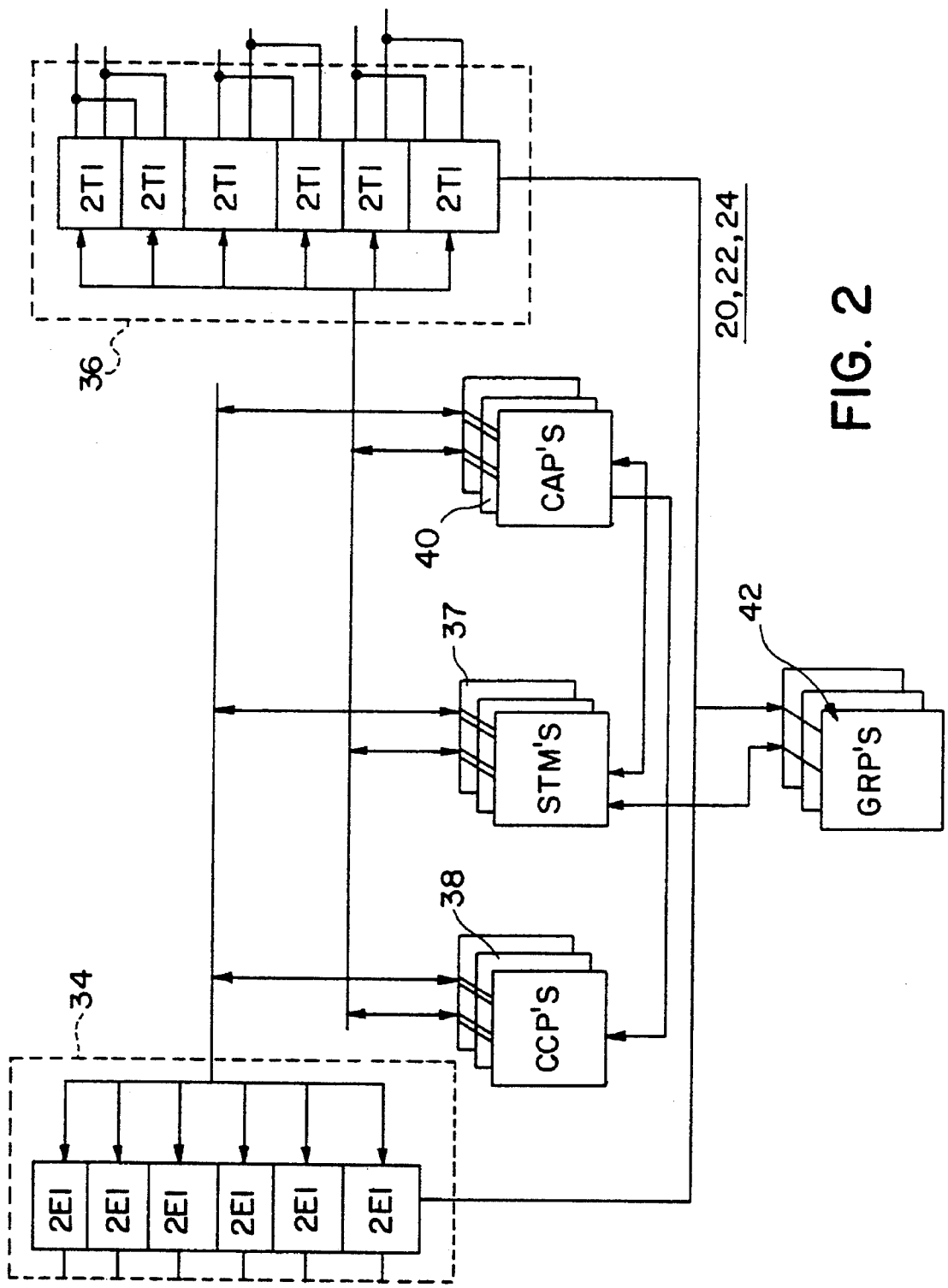
FIG. 2 is a diagram of a base station controller utilized in carrying out the present invention.

Referring to FIG. 2, each BSC 20, 22 and 24 includes trunk interfaces 34 to its associated MSC and trunk interfaces 36 to its associated BTS. Also, each BSC includes a switching and transcoding module (STM) 37. Additionally, each BSC is made up of three types of control processors, which are implemented in identical hardware modules 38, 40, and 42.

Module 38 is a call control processor (CCP). In addition to switching of pulse code modulation (PCM) traffic between trunks 34 and 36 for analog traffic, it terminates call protocol for mobile switching, such as fast analog control channel (FACCH)/slow analog control channel (SACCH) processing and handoff execution. CCP also communicates with MSC for handoff execution. It also performs connection control and mobility management for handoff execution as hereinafter described in detail. For digital configurations there can be more than one CCP for each BSC.

Hardware module 40, which is a channel access processor (CAP), is required for digital configurations as described herein and performs voice channel allocations and deallocations and forwards power and timing measurements to the CCP's. Handoff measurement between an overlay and underlay cell of the present invention is initiated after one measurement period has expired, and none of the neighboring cells meet the required handoff criteria. This, of course, would be the case where a mobile unit is in a location for handoff between an overlay and underlay cell.

Hardware module 42 is a global resource processor (GRP) that distributes calls among the CCP's based on load; and communicates with other BSC's for scanning receiver measurements; that is, a GRP communicates with another BSC to exchange messages relating to scanning (SR) measurements.

Figure 3:
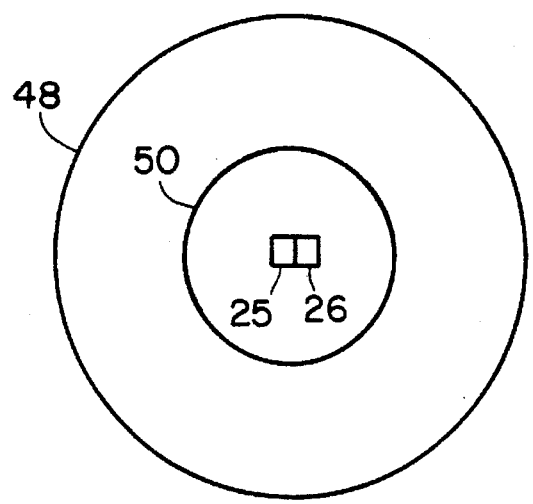
FIG. 3 is a diagram of a typical arrangement of an overlay and underlay cell.

Referring to FIG. 3, each of the circles 48 and 50 represents a geographic boundary of an individual cell. For example, circle 48 represents the boundary of a geographical area for the BTS 26 (FIG. 1); and circle 50 represents the geographical area for the BTS 25.

The cell bounded by circle 48 is referred to herein as the overlay cell, and the cell bounded by circle 50 is the underlay cell. Although not required, in the illustrated embodiment the BTS 25 and BTS 26 are relatively close together. However, it is contemplated that underlay and overlay cells are two or more cells where the underlay cell has a smaller area which is substantially common with the overlay cell.

Figure 4:
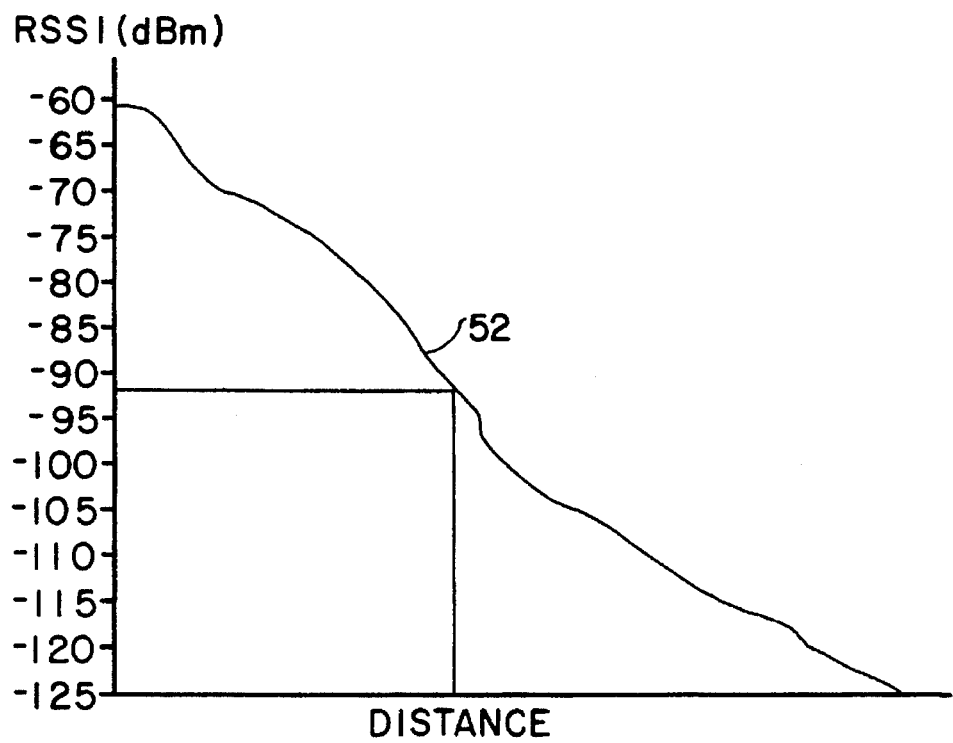
FIG. 4 is a diagram illustrating the manner of selecting a nominal or predefined threshold for an underlay cell in accordance with the present invention.

As shown in FIG. 4, typically the signal strength of a particular cell may range from minus sixty dBM at the center of a cell to minus one hundred twenty dBM beyond the boundary of the cell. Assuming that a mobile unit is traveling outwardly from a base station 25 or 26, the signal strength of the traffic channel decreases as indicated by line 52. In initially determining the RF signal strength for a nominal threshold, the RF signal strength measurement for the overlay cell 48 is calibrated as the mobile travels outwardly. While these measurements are being calibrated, the mobile transmit attenuation level is set by a command from the BSC to the minimum level allowed by the underlay cell. After completion of the measurements, a diagram similar to FIG. 4 may be plotted; and a point can be selected at a level where adequate signal quality can be maintained for both the cell 48 and the cell 50 while at the same time minimizing RF interference in the cellular network. As shown in FIG. 4, this nominal threshold may be in the neighborhood of approximately −90 dBM, for example.

There are several different classes of mobile telephones, which are classified in accordance with several parameters, including power output. When a mobile unit establishes a call, its class is recognized, and the BSC is commanded to control the unit at a particular mobile attenuation level, ($M_T$) which may or may not be greater than its minimum attenuation level depending on its distance from the BTS and the power output of the mobile unit. In one preferred embodiment, a mobile unit may be commanded by a BSC to operate on any one of eight attenuation levels with each increment corresponding to 4 dB, for example. Thus, when a low or lowest attenuation level is referred to herein, a high or highest power output of the mobile unit is presumed; and when a high or highest attenuation level is referred to herein, the low or lowest power output of the mobile unit is presumed.

Prior to describing in detail the exemplary embodiment of that portion of the system and method for effecting the handoff between an overlay and underlay cell, an explanation and detailed description of the meaning of the letter designations is set forth.

The designation RSSI-SRV refers to the RF signal strength of a mobile unit operating in a serving cell and measured by the serving cell. This signal also may be the traffic channel RF signal strength of the mobile unit in the serving cell.

The designation RSSI-U refers to a nominal handoff threshold for the underlay cell. This nominal threshold is permanently configured into the system and is determined as hereinbefore described.

The designation MT refers to the current attenuation level of a mobile unit. MU refers to the minimum attenuation level permitted by the underlay cell.

The designation RSSI-THP refers to the adjusted threshold which is determined in accordance with the nominal threshold, the current attenuation level of the mobile unit, and the minimum permissible attenuation level of the underlay cell.

The parameters used in handing off the on-going mobile communications in accordance with the present invention are either listed in the BSC where they relate to a status or a design of the system, or calculated in the BSC based on measurements taken at the BTS. The transmitter attenuation level of a mobile unit for a particular channel, which is an attenuation level that has been commanded by the BSC as determined by the forward or reverse traffic channel of the serving cell, is also listed in the associated BSC. The mobile units minimum attenuation level relates to the design of the mobile telephone, and is entered in the BSC when a particular unit either initiates or responds to a call. The minimum mobile transmit attenuation level allowed by the underlay cell is also listed in the associated BSC. A mobile unit shall not transmit at a power level higher than permitted by the minimum permissible attenuation level as determined by the cellular boundaries.

Each BSC of a digital system maintains a list for its appropriate associated BTS's that includes the received signal strength of a traffic channel for a mobile unit in the underlay and overlay cells.

The threshold level RSSI-THP which determines whether an on-going call is to be handed off to the underlay or overlay cell as the case may be is determined by subtracting the current attenuation level of the mobile unit MT from the minimum attenuation level permitted by the underlay cell MU, adding this difference to the nominal threshold level RSSI-U and multiplying the sum by four, which corresponds to the number of dBM's in an attenuation level. This may be expressed as $$RSSI\text{-}THP = RSSI\text{-}U + [MU-MT]*4$$

A more detailed description of the method and system of invention is provided herein in connection with a description of operation. In describing the operation, reference will be made to FIGS. 5 and 6 as appropriate.

Figure 5:
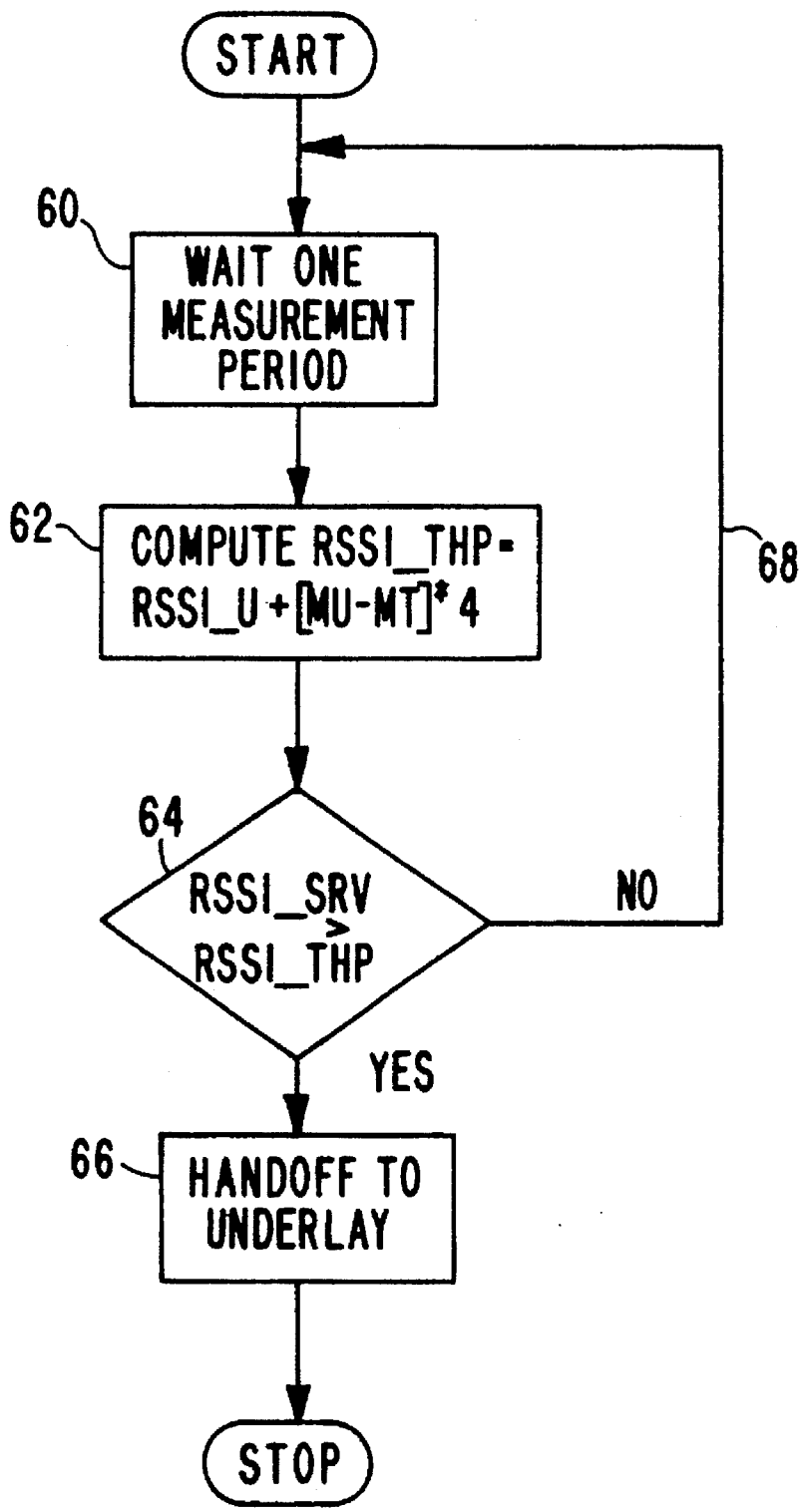
FIG. 5 is a flow chart illustrating a handoff criteria from overlay to underlay in accordance with one embodiment of the invention.

Referring to FIG. 5, when the RF signal strength of a serving cell falls to a pre-selected value, handoff measurements are taken of neighboring cells in order to determine possible candidate cells for handoff. When a mobile unit is in the overlay cell, it may be in a position for handing off to a neighboring cell or to no cell at all, or to the underlay cell. After it is determined there are no neighboring cells that meet the measurement criteria at the end of the measurement period, which is referred to at block 60, the threshold level RSSI-THP is determined at block 62 as follows $$RSSI\text{-}THP = RSSI\text{-}U + [MU-MT]*4$$

The result is then compared with the RF signal strength of the overlay cell in which it is serving. If the RF signal strength RSSI-SRV is greater than the calculated threshold RSSI-THP, the mobile unit is handed off to the underlay cell as indicated at block 66. If RSSI-SRV is equal to or less than RSSI-THP, the mobile unit continues to operate in the overlay cell until the routine is again run after the next measurement period as indicated by line 68.

Figure 6:
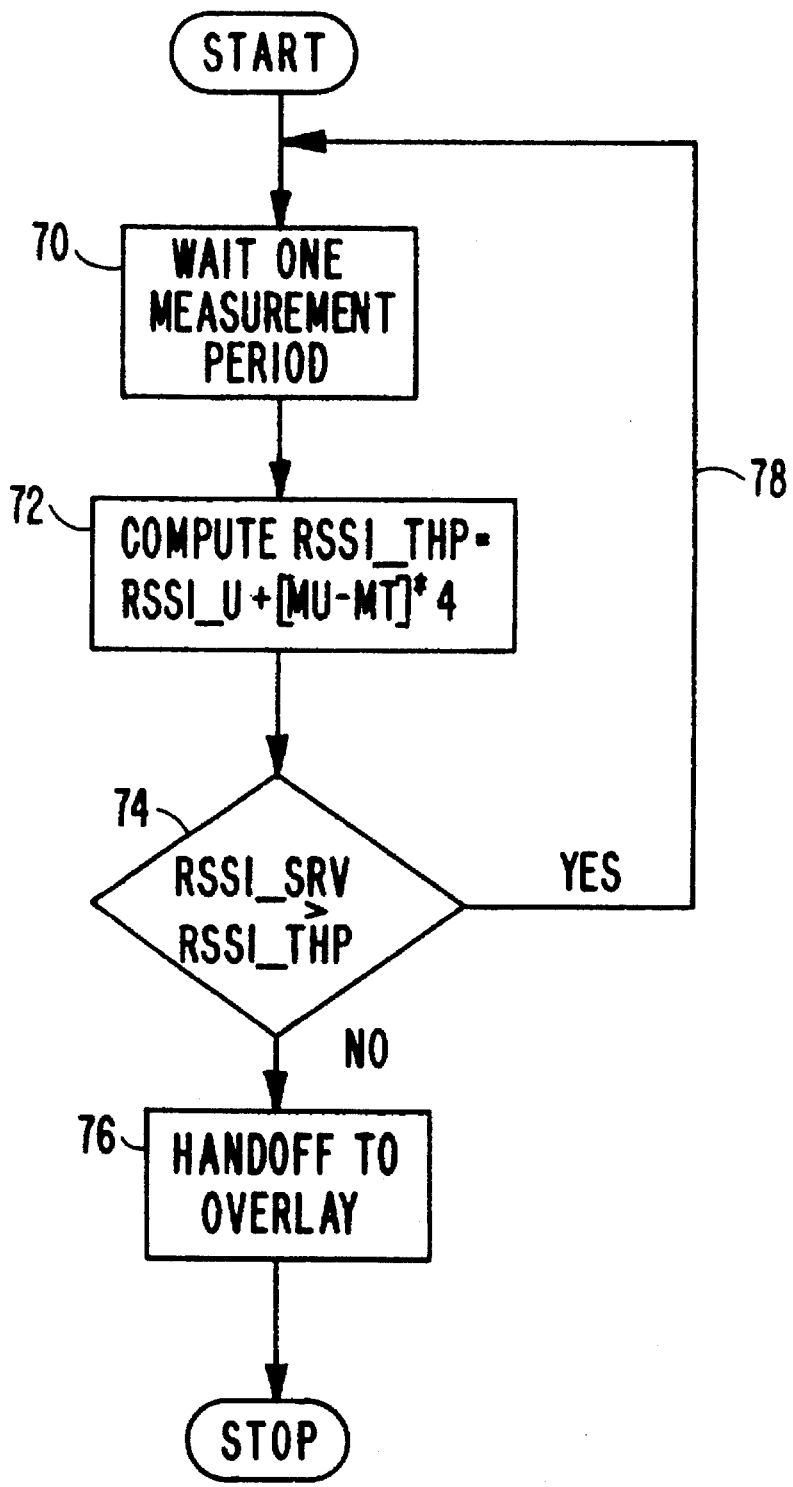
FIG. 6 is a flow chart illustrating a handoff criteria from underlay to overlay in accordance with one embodiment of the invention.

FIG. 6, is a flowchart for a mobile unit operating in the underlay cell. After waiting one measurement period as indicated at block 70 to determine if there are any candidate neighboring cells, the adjusted threshold THP is calculated based on the threshold level RSSI-U and the attenuation levels MU and MT as described in connection with FIG. 5 and as indicated at block 72. This value is then compared with the RF signal strength RSSI-SRV of the underlay cell. If RSSI-SRV is equal to or less than the calculated RSSI-THP at block 74, the mobile unit is handed off to the overlay cell as indicated at block 76. If the value RSSI-SRV is greater than RSSI-THP, the mobile unit remains in communication with the underlay cell until the routine runs again after the next measurement period as indicated by line 78.

In summary, there has been described a cell arrangement that is used to increase the channel capacity of the cellular networks while minimizing interference. Calls established in the overlay cell are handed off to the underlay cell when the mobile unit is within the coverage area of the underlay cell; and calls established in the underlay cell are handed off to the overlay cell when the mobile unit is outside the coverage area of the underlay cell. The described system and method is simple and efficient. In the case of analog calls, it eliminates the need for the scanning receivers at the BTS of the underlay cell for handoff purposes. In the case of digital calls, either forward (i.e., mobile measurement) or reverse (traffic channel measurement) may be used. The system and method herein also enables handoff to and from underlay cells, regardless of the transmit attenuation level of the mobile unit.

It will be apparent to those skilled in the art that various modification and variations can be made in the method and system of the present invention without departing from the spirit or scope of the invention. Thus, it is intended that the present invention cover modifications and variations of this invention provided they come within the scope of the appended claims and their equivalents.

What is claimed:

1. A method of handing off an on-going communication of a mobile unit between an overlay cell having a first coverage area and an underlay cell having a second coverage area common with and less than the first coverage area, the method comprising:

establishing a threshold level by establishing a predefined nominal threshold level; and adjusting the predefined nominal threshold level in accordance with the current transmit attenuation level of the mobile unit;

handing off the on-going communication of the mobile unit to the underlay cell at times when RF signal strength of the serving cell is greater than the established threshold level and to the overlay cell at times when the RF signal strength of the serving cell is equal to or less than the established threshold level; and wherein in the step of establishing the threshold level the substep of establishing a predefined nominal threshold level comprises predefining a nominal threshold level in accordance with the RF signal strength of a traffic channel of the serving cell and the minimum attenuation level of the mobile unit permitted by the underlay cell at times when a mobile unit is in the overlay cell.

2. A method of handing off an on-going communication of a mobile unit between an overlay cell having a first coverage area and an underlay cell having a second coverage area common with and less than the first coverage area, the method comprising:

establishing a threshold level by establishing a predefined nominal threshold level; and adjusting the predefined nominal threshold level in accordance with the current transmit attenuation level of the mobile unit;

handing off the on-going communication of the mobile unit to the underlay cell at times when RF signal strength of the serving cell is greater than the established threshold level and to the overlay cell at times when the RF signal strength of the serving cell is equal to or less than the established threshold level; and wherein the substep of predefining the nominal threshold level includes establishing a call in the overlay cell, setting a mobile transmit attenuation level to a value corresponding to the minimum transmit attenuation level permitted by the underlay cell;

measuring the RF signal strength of the traffic channel of the overlay cell as a function of distance from a base transceiver station; and selecting a nominal threshold value corresponding to the RF signal strength of the overlay cell at a desired distance from a base station of the overlay cell.

3. A cellular communication system, having a plurality of base station transceivers positioned adjacent one another, one of said plurality of transceivers having a signal strength greater than a signal strength of an adjacent transceiver to define an underlay and an overlay cell, the system comprising a base station controller coupled to the plurality of base station transceivers for storing at times a current transmit attenuation level of a mobile unit and storing a minimum mobile transmit attenuation level permitted by the underlay cell;

means for establishing a threshold level for a mobile unit comprising a predefined nominal threshold level stored in the base station controller; and means for adjusting the predefined nominal threshold level in accordance with the current transmit attenuation level of the mobile unit; and means for handing off the mobile unit to the overlay cell at times when the RF signal strength of the serving cell is equal to or less than the established threshold level, and to the underlay cell at times when the RF signal strength of the serving cell is greater than the established threshold level.

4. The system of claim 3 wherein the means for establishing the threshold level comprises means for adjusting a nominal threshold level in accordance with the current attenuation level and the minimum attenuation level permitted by the underlay cell.

5. The system of claim 4 wherein the means for adjusting the nominal threshold level includes means for adding a value corresponding to the minimum attenuation level permitted by the underlay cell less the current attenuation level of the mobile unit to the nominal threshold level.

6. In a cellular communication system, having a plurality of base station transceivers, one of said plurality of transceivers having a signal strength greater than a signal strength of an adjacent transceiver to define an underlay and an overlay cell, comprising a method of handing off an ongoing communication of a mobile unit between an underlay and an overlay cell comprising storing in a base station controller coupled to the plurality of base station transceivers, a current transmit attenuation level of a mobile unit and storing a minimum mobile transmit attenuation level permitted by the underlay cell;

establishing a threshold level for a mobile unit comprising a predefined nominal threshold level stored in the base station controller;

adjusting the predefined nominal threshold level in accordance with the current transmit attenuation level of the mobile unit; and handling off the mobile unit to the overlay cell at times when the RF signal strength of the serving cell is equal to or less than the established threshold level, and to the underlay cell at times when the RF signal strength of the serving cell is greater than the established threshold level.

7. The method of claim 6 wherein the step of adjusting the predefined nominal threshold level comprises the substeps of redefining a nominal threshold level in accordance with the RF signal strength of a traffic channel of the serving cell and the minimum attenuation level of the mobile unit permitted by the underlay cell at times when a mobile unit is in the overlay cell.

8. The method of claim 6 wherein the step of adjusting the predefined nominal threshold level includes establishing a call in the overlay cell, setting a mobile transmit attenuation level to a value corresponding to the minimum transmit attenuation level permitted by the underlay cell;

measuring the RF signal strength of the traffic channel of the overlay cell as a function of distance from a base transceiver station; and selecting a nominal threshold value corresponding to the RF signal strength of the overlay cell at a desired distance from a base station of the overlay cell.

9. The method of claim 6 wherein the step establishing the threshold level comprises adjusting a nominal threshold level in accordance with the current attenuation level and the minimum attenuation level permitted by the underlay cell.

10. The method of claim 9 wherein the step of adjusting the nominal threshold level includes adding a value corresponding to the minimum attenuation level permitted by the underlay cell less the current attenuation level of the mobile unit to the nominal threshold level.

11. The method of claim 9 wherein the step of adjusting the threshold level comprises subtracting a current transmit attenuation level of a mobile unit from a minimum transmit attenuation level permitted by the underlay cell; and adding the difference to the nominal threshold level.

\* \* \* \* \*